(12) United States Patent
Kaiser et al.

(10) Patent No.: US 8,695,004 B2
(45) Date of Patent: Apr. 8, 2014

(54) METHOD FOR DISTRIBUTING COMPUTING TIME IN A COMPUTER SYSTEM

(75) Inventors: Robert Kaiser, Wiesbaden (DE); Rudolf Fuchsen, Stadecken-Elsheim (DE)

(73) Assignee: Sysgo AG (DE)

( * ) Notice: Subject to any disclaimer, the term of this patent is extended or adjusted under 35 U.S.C. 154(b) by 752 days.

(21) Appl. No.: 11/719,177

(22) PCT Filed: Nov. 11, 2005

(86) PCT No.: PCT/EP2005/012104
§ 371 (c)(1),
(2), (4) Date: Apr. 17, 2009

(87) PCT Pub. No.: WO2006/050967
PCT Pub. Date: May 18, 2006

(65) Prior Publication Data
US 2009/0210879 A1     Aug. 20, 2009

(30) Foreign Application Priority Data
Nov. 11, 2004   (DE) .................... 10 2004 054 571

(51) Int. Cl.
*G06F 9/46*    (2006.01)

(52) U.S. Cl.
USPC ........................................................ 718/103

(58) Field of Classification Search
USPC ........................................................ 718/103
See application file for complete search history.

(56) References Cited

U.S. PATENT DOCUMENTS 5,745,778 A    4/1998  Alfieri et al.
7,716,668 B2 *  5/2010  Moore et al. ................... 718/104

FOREIGN PATENT DOCUMENTS

| DE | 10 2004 054571 | 8/2006 |
| EP | 0 658 841 | 6/1995 |
| EP | 0 880 095 | 5/1997 |
| EP | 1 286 264 | 2/2003 |

OTHER PUBLICATIONS

Ramamritham, K., *Scheduling Algorithms and Operating Systems Support for Real-Time Systems*, Proceedings of the IEEE, vol. 82, No. 1, Jan. 1994, pp. 55-67.
Database Inspec (Online) The Institution of Electrical Engineers, Stevenage, GB: 1998, Terrara A et al: Extending RT-Linux to support flexible hard real-time systems with optical components.

(Continued)

*Primary Examiner* — Andrew Caldwell
*Assistant Examiner* — Benjamin Geib
(74) *Attorney, Agent, or Firm* — Ostrolenk Faber LLP

(57) ABSTRACT

The invention relates to a method for distributing computing time in a computer system on which run a number of partial processes or threads to which an assignment process or scheduler assigns computing time as required, priorities being associated with individual threads and the assignment of computing time being carried out according to the respective priorities. According to said method, the individual threads are respectively associated with a number of time priority levels. A first time priority level contains threads to which computing time is assigned as required at any time. A first scheduler respectively allocates a time slice to the individual time priority levels, and respectively activates one of the time priority levels for the duration of the time slice thereof. A second scheduler monitors the threads of the first time priority level and the threads of the respectively activated time priority level, and assigns computing time to said threads according to the priorities thereof.

6 Claims, 3 Drawing Sheets

(56) References Cited

OTHER PUBLICATIONS

Procedding of ACM sigplan 1998 Workshop on Languages, compiles, and tools for embedded systems (in conjunction W/PLDI' 98) Jun. 19-20, 1998 Montreal, Que., Canada, Jun. 1998.

Terrasa A et al. Real-Time synchronization between hard and soft tasks in RT-Linux: Real time computing system and applications, 1999.

International Search Report PCT/EP2005/012104 dated Mar. 7, 2006.

* cited by examiner

METHOD FOR DISTRIBUTING COMPUTING TIME IN A COMPUTER SYSTEM

CROSS REFERENCE TO RELATED APPLICATION

The present application is a 35 U.S.C. §§371 national phase conversion of PCT/EP2005/012104, filed Nov. 11, 2005, which claims priority of German Patent Application No. 10 2004 054 571.5, filed Nov. 11, 2004. The PCT International Application was published in the German language.

BACKGROUND OF THE INVENTION

The invention relates to a method for distributing computation time in a computer system The method according to the invention can be applied, in particular, to computer systems which process a number of tasks in the form of competing subprocesses or "threads". In this context, an activity or a program which is being executed is denoted as a "thread". Also in common use for this are the terms of "task" or "process"; however, depending on context, these also implicitly include assumptions relating to further properties such as, for example, the address space in which the program is running. These further properties are, however, of no importance for the present invention.

An allocation process which is usually designated as a "scheduler" determines which thread comes to be executed, and when, that is to say which thread is allocated computation time or a processor. The scheduler is thus an algorithm which decides which thread comes to be executed, and when.

In such a computer system in which a number of mutually independent tasks can be processed in the form of threads, a thread can assume various states:

Computing: the thread has a computation time requirement and is being executed, that is to say it has been allocated a processor.

Willing to compute: the thread is ready for execution and therefore has a computation time requirement and is waiting for a processor to be allocated to it.

Blocked: the thread is not ready for execution and is waiting for an external event.

A thread goes over actively from the computing state into the blocked state by calling up the operating system as appropriate. The change from blocked to willing to compute happens through the onset of the external event, or the prompting of another thread, which undertakes an appropriate system call-up to this end. So that a thread willing to compute can become computing, the scheduler needs to allocate it one of the available processors. Whenever a thread changes either from the computing state into the blocked state, or
   from the blocked state into the willing to compute state,
   the scheduler is called up in order either to allocate the processor becoming free a new process ready for computation, or to withdraw the processor from one of the computing threads if the thread becoming willing to compute is classified as more important.

From the point of view of the scheduler, there are a number of threads willing to compute which are competing for the allocation of a processor. It is assumed that the number of available processors is generally smaller than the number of threads ready for computation, that is to say the scheduler normally finds more "competitors" for a processor than there are processors to be awarded.

A multiplicity of procedures are known as to how a scheduler can be used to fix the thread to which a processor is allocated at a respective point in time.

In the case of a first method, which is known as priority method, priorities are assigned to the individual threads. A thread of relatively high priority obtains preference over a thread of relatively low priority. Depending on requirement, threads of the same priority are either not admissible, or they are placed in a queue in the sequence in which they become willing to compute. Depending on requirements, the priority of the individual threads can both be statistically fixed and be dynamically determined and be continuously corrected.

In the case of the priority method, there is no possibility of guaranteeing a thread a computation time allocation: threads having a high priority can occupy the processors as long as desired, and it can happen in the extreme case that threads having a low priority never become computing.

In a further method, which is also known as time slice method (round robin), the period of time for which a thread may use a processor is limited. As soon as a thread currently operating has used the processor allocated to it for more than a fixed duration (that is to say it has "consumed" its "time slice"), it is necessarily interrupted. In this case, the thread remains willing to compute, and is placed at the end of a queue. Depending on requirements, the duration of the time slice can be a constant or a thread-specific variable. This method requires an external timer which activates the operating system via an interrupt at specific time intervals so that said operating system can monitor the time consumed by the running thread and, if appropriate, can activate the scheduler.

The time slice method enables the allocation of computation time, but it does not permit a rapid reaction to external events: in the most unfavorable case, a thread which becomes willing to compute on the basis of an interrupt, for example, must wait for the entire cycle, that is to say the time slices of all the other threads willing to compute, before it can become computing.

In many computer systems, in particular in computer systems having a number of threads of which some are subject to real time requirements, however, at least these "real time threads" must be able to react to external events within a maximum time which is guaranteed and, ideally, as short as possible, that is to say they must be able to become computing. At the same time, threads exist which require a minimum allocation of computation time in order to accomplish their respective activities. It must also be possible to guarantee such a time allocation for threads. Combinations of the above-named methods are correspondingly known.

In a method known from EP-A2-0658 841 groups of threads are assigned priorities, and the individual threads are allocated computation time inside the groups in a time slice method.

In a further method, known from EP-A2-880 059, the threads are grouped into classes which are arranged in a hierarchy. Each class has a time function value which determines when the class is allocated computation time. Within a level of the hierarchy, computation time priorities are defined by one or more time-based functions which can be constant or change dynamically.

SUMMARY OF THE INVENTION

The invention is based on the object of providing a method of the type mentioned at the beginning which permits reliable statements relating to the computation time due to individual threads, and in the case of which computation time promised but then not taken up can be dynamically redistributed.

According to the invention, a method is provided for distributing computation time in a computer system on which there is running a number of subprocesses or "threads" (N0, S0, P0, W1, W2) to which, if required, an allocation process or "scheduler" allocates computation time, individual threads (N0, S0, P0, W1, W2) being assigned priorities, and the allocation of computation time being performed as a function of the respective priorities.

The method according to the invention is characterized
in that the individual threads are respectively assigned to a number of time partitions,
in that a first of the time partitions includes threads which are allocated computation time, if required, at any time,
in that a first scheduler respectively assigns the individual time partitions a time slice, and respectively activates one of the time partitions for the duration of its time slice,
and in that a second scheduler monitors the threads of the first time partition and the threads of the respectively activated time partition, and allocates these threads computation time as a function of their priorities.

In accordance with one refinement of the invention, the first scheduler is a thread of the first time partition.

Here, preferably, threads of the first time partition which have a low priority additionally can obtain computation time of the respectively activated further time partitions when the further time partitions include no threads having a computation time requirement.

The first scheduler can be implemented as an endless loop and have a high priority.

The second scheduler is always called up whenever a thread registers or relinquishes a computation time requirement.

In the case of the method according to the invention, it can thereby be ensured that the reaction time of threads to external events always lies below an assured maximum time.

The invention is explained in yet more detail below with the aid of exemplary embodiments illustrated in the drawing.

The method according to the invention combines the properties of the time slice method and the priority method. As in the case of the priority method, the threads have a priority as attribute. In addition, each thread willing to compute is assigned to a respective time partition. A time partition therefore designates a quantity of threads willing to compute with different priority, in general.

There is a specific first time partition, the so-called background partition. The threads which are assigned to the background partition can become computing at any time. It holds for all the remaining time partitions that the threads assigned to them can only ever become computing when the relevant time partition is "active", it being possible, in addition to the background partition, for at most one further time partition to be active at any one time.

The method uses two primary schedulers: a first scheduler, designated as time partition scheduler, respectively assigns the various time partitions a time slice, and activates one of the time partitions each for the duration of its time slice. A second scheduler, designated as thread scheduler, considers the union set of the threads of the background partition and the currently active partition, and allocates the available processors to the threads from this set which have the highest priority.

The threads of the background partition have various functions, depending on their priority:

1. Threads of the background partition which have a high priority can implement services which are to be jointly used by threads of various other time partitions. Moreover, such threads can take over tasks of the operating system such as, for example, the monitoring of other threads or of the state of the overall system. In particular, the time partition scheduler itself can be implemented as a thread of the background partition.
2. Threads of the background partition which have a relatively low priority obtain computation time whenever the currently active time partition has no threads willing to compute, that is to say when the threads assigned to it do not call upon the time allocation awarded to them, for example because they must wait on external events. There is thus a possibility for computation time that has been awarded and yet not called upon to be fed to rational use.

DESCRIPTION OF A PREFERRED EMBODIMENT

Figure 1:
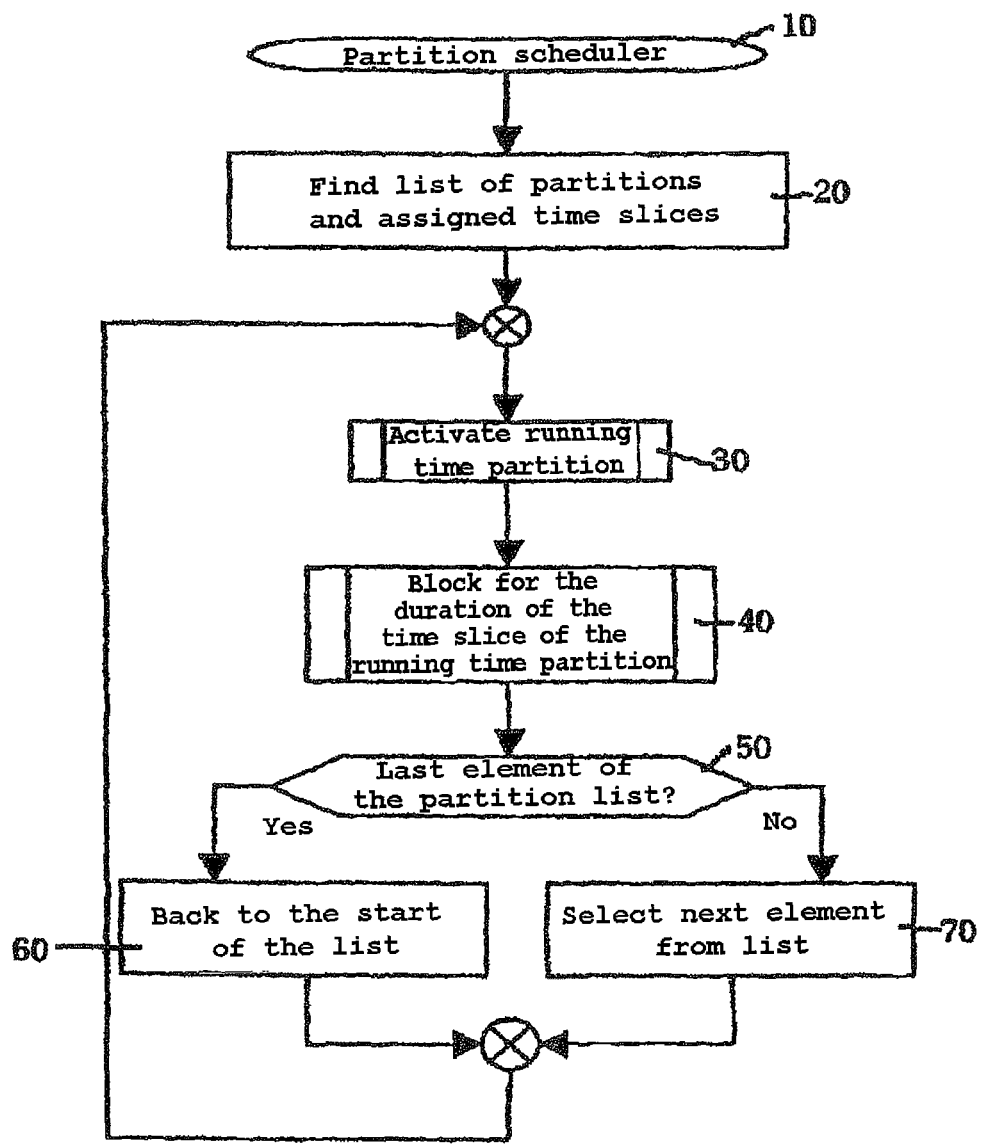
FIG. 1 shows an exemplary embodiment of a flowchart of the first (time partition) scheduler in accordance with the invention.

FIG. 1 illustrates the mode of operation of a time partition scheduler 10 with reference to a typical example. It is assumed here that the time partitions of the system are to be activated cyclically, for a defined time slice duration in each case. The time partition scheduler is implemented in this example as an endless loop which runs as a thread of high priority within the background partition. In step 20, the thread reads a list of time partitions with the associated time slice durations. For each list element, the designated time partition is firstly activated in step 30, and in step 40 the thread subsequently blocks for the duration of the time slice of the time partition just activated. A check is made in step 50 as to whether the end of the list has been reached. If the end of the list has not yet been reached, the next element is selected from the list in step 70. If the end of the list has been reached, the processing begins anew at the start via step 60.

Figure 2:
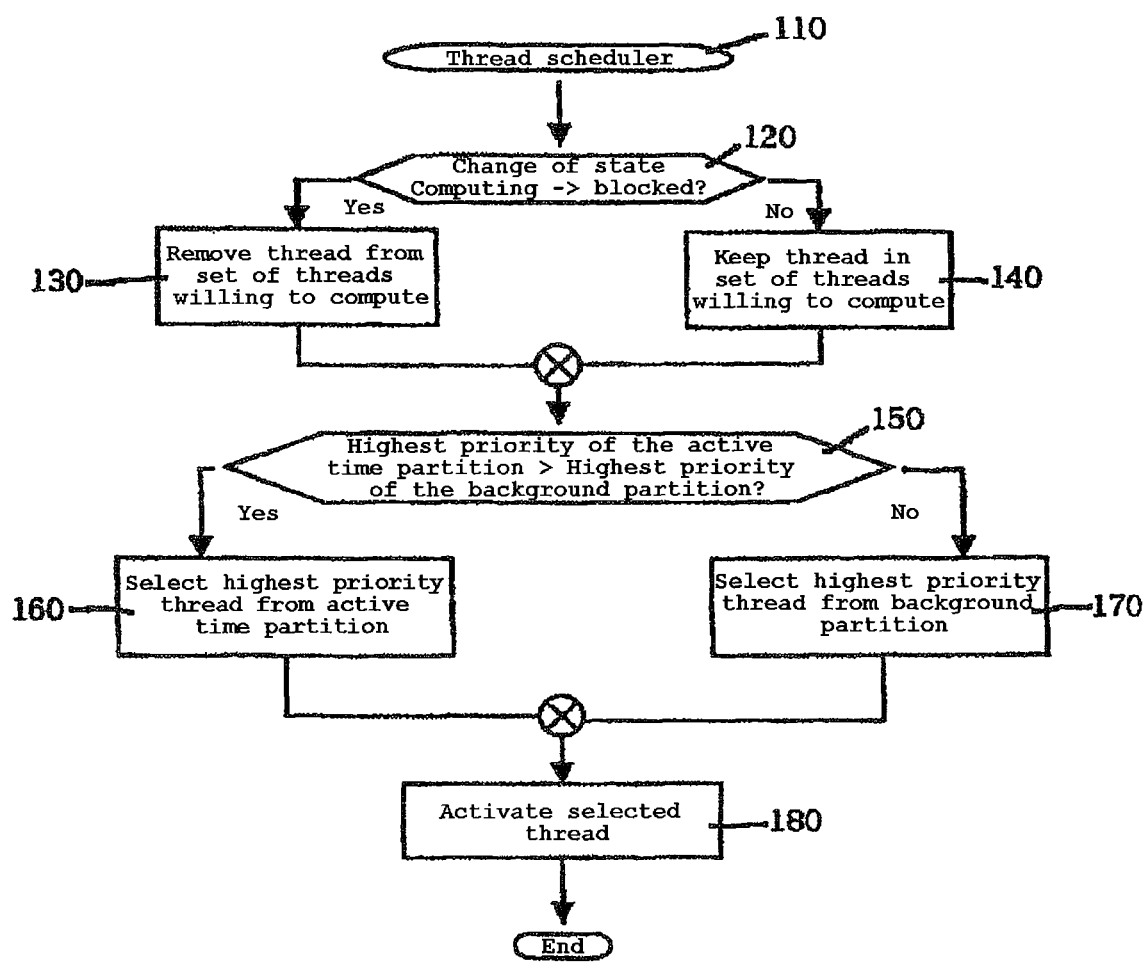
FIG. 2 shows an exemplary embodiment of a flowchart of the second (thread) scheduler in accordance with the invention.

An exemplary embodiment of the thread scheduler 110 is shown in FIG. 2. The thread scheduler is called up whenever the state of a thread changes from computing to blocked, or when a previously blocked thread assumes the state of willing to compute (for example on the basis of an external event), this being established in step 120. In the first case, it is necessary in step 130 for the newly blocked thread to be removed from the set of threads willing to compute of the time partition assigned to it, whereas in the second case all currently computing threads remain willing to compute in step 140. Subsequently in step 150 the highest priorities both of the currently active time partition and of the background partition are determined. If the maximum priority of the currently active time partition is above that of the background partition, in step 160 the thread of this time partition, which has the highest priority, is transferred into the state of computing, while otherwise the thread of the background partition which has the highest priority is selected in step 170. The selected thread is subsequently activated in step 180.

When the maximum priority of the currently active time partition is equal to the maximum priority of the background partition, the background partition is preferred in this example. It would equally well be possible here, as a function of the respective requirements, to give preference to the currently active time partition.

Figure 3:
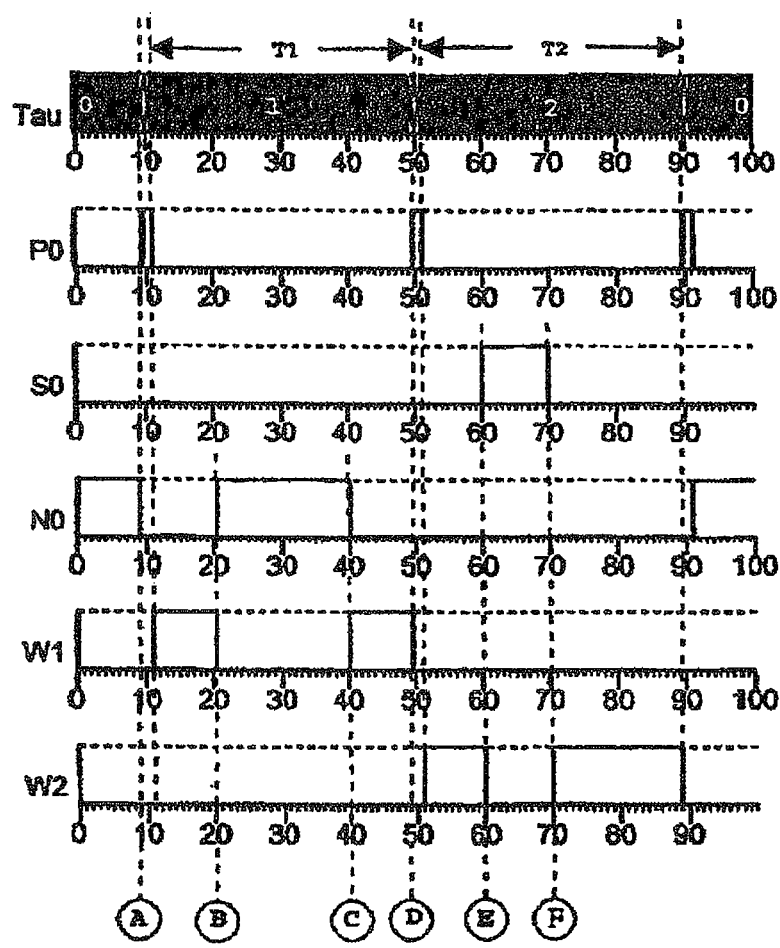
FIG. 3 shows an illustration of an example of a scheduling cycle.

An example of a scheduling cycle is shown in FIG. 3. This figure uses an example to illustrate the way in which the method according to the invention functions. It is assumed in this example that only one processor is present. There are two time partitions Tau1 and Tau2 having the threads W1 and W2, and in addition there is the background partition Tau0. There are a thread of low priority named N0, a thread of average priority named S0, and a thread of high priority named P0 in Tau0.

Let P0 be the time partition scheduler in accordance with FIG. 1, that is to say this thread becomes computing for a short time in each case in order to switch over the active time partition, and subsequently blocks in each case for the duration of the time slice of the active time partition (iT1 or T2 in FIG. 3).

Let S0 be a "server" which is used by W1 and W2 together and which furnishes services upon demand from these threads, and otherwise blocks.

Let N0 be a background thread which is continuously willing to compute and never blocks.

Neither of the two time partitions Tau1 and Tau2, respectively, is initially active in the example. There are three threads willing to compute: W1, W2 and N0. Since, however, the time partitions of W1 and W2 are not active, these threads do not become computing despite their relatively high priority. N0 is the sole thread willing to compute in the background partition Tau0 (P0 and S0 are blocked). Consequently, N0 is initially computing. At the instant A, the time partition scheduler P0 becomes willing to compute and at the same time computing, since its priority is above that of N0. P0 activates the time partition Tau1, and subsequently blocks for the duration T1. Since Tau1 is now active, the thread W1 assigned to this time partition becomes willing to compute and, since its priority is above that of N0, it becomes computing. W1 blocks at the instant B in order to await an external event. This event occurs at the instant C. The time between the instants B and C is promised for the time partition Tau1, but there is no thread assigned to Tau1 which could call upon this time. Consequently, this unused time is allocated to N0. After expiry of the time slice T1 of the partition Tau1 at the instant D, the time partition scheduler P0 becomes computing. It activates the time partition Tau2 and subsequently blocks for the duration T2. Since Tau2 is now active, the thread W2 assigned to this time partition becomes computing. At the instant E, W2 requests a service from the server S0 and blocks in order to await its answer. S0 thereupon becomes willing to compute and, since its priority is above that of N0, becomes computing. At the instant F, S0 has furnished the requested service, sends an appropriate notification to its user W2 and blocks while waiting for the next job. W2 thereupon becomes computing again and operates up to the expiry of the time slice of its time partition Tau2. At this point, the time partition scheduler P0 becomes computing again and reactivates the background partition Tau0. The same conditions as at the beginning of the cycle therefore prevail again.

The invention claimed is:

1. A method for distributing computation time in a computer system running a number of subprocesses or "threads" to which, if required, an allocation process or "scheduler" allocates computation time, individual threads being assigned priorities, and the allocation of computation time being performed as a function of the respective priorities, comprising:
    invariably assigning each one of the individual threads to a respective one of a number of time partitions,
    wherein threads which are allocated computational time at any time, if required, are assigned to a first time partition,
    providing a partition scheduler arranged to assign a respective time slice to the individual time partitions, and respectively activating a further one of the time partitions for the duration of the respective time slice of the further one of the time partitions, and
    providing a thread scheduler arranged for monitoring the threads of the first time partition and the threads of the respectively activated further one of the time partitions; and for
    allocating computation time for the threads as a function of priorities of the threads of the first time partition and the threads of the respectively activated further one of the time partitions.

2. The method according to claim 1, wherein the partition scheduler is a thread of the first time partition.

3. The method according to claim 2, wherein the partition scheduler is implemented as an endless loop and has a high priority.

4. The method according to claim 1, wherein threads of the time partition which have a lower priority additionally obtain computation time of the respectively activated further time partition when the respectively activated further partition includes no threads having a computation time requirement.

5. The method according to claim 1, wherein the thread scheduler is always called up whenever a thread registers or relinquishes a computation time requirement.

6. The method according to claim 1, wherein the reaction time of threads to external events always lies below an assured maximum time.

* * * * *

UNITED STATES PATENT AND TRADEMARK OFFICE
CERTIFICATE OF CORRECTION

PATENT NO. : 8,695,004 B2  Page 1 of 1
APPLICATION NO. : 11/719177
DATED : April 8, 2014
INVENTOR(S) : Kaiser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1560 days.

Signed and Sealed this

Twenty-ninth Day of September, 2015

Michelle K. Lee
*Director of the United States Patent and Trademark Office*